(12) United States Patent
Takimoto

(10) Patent No.: US 7,445,232 B2
(45) Date of Patent: Nov. 4, 2008

(54) AIRBAG AND AIRBAG APPARATUS

(75) Inventor: Takayuki Takimoto, Shiga (JP)

(73) Assignee: Takata Corporation (JP)

( * ) Notice: Subject to any disclaimer, the term of this patent is extended or adjusted under 35 U.S.C. 154(b) by 324 days.

(21) Appl. No.: 10/812,640

(22) Filed: Mar. 30, 2004

(65) Prior Publication Data
US 2005/0206137 A1 Sep. 22, 2005

(30) Foreign Application Priority Data

| May 7, 2003 | (JP) | ............................. 2003-129225 |
| Dec. 9, 2003 | (JP) | ............................. 2003-410578 |

(51) Int. Cl.
*B60R 21/16* (2006.01)

(52) U.S. Cl. ................. 280/729; 280/743.1; 280/743.2; 180/271; 180/274

(58) Field of Classification Search ................. 280/729, 280/743.1, 743.2; 180/271, 274; *B60R 21/34*
See application file for complete search history.

(56) References Cited

U.S. PATENT DOCUMENTS

| 5,692,774 | A | 12/1997 | Acker et al. |
| 5,845,935 | A | 12/1998 | Enders et al. |
| 5,906,391 | A | 5/1999 | Weir et al. |
| 6,364,348 | B1 * | 4/2002 | Jang et al. ................. 280/730.2 |
| 6,988,578 | B2 * | 1/2006 | Kikuchi et al. .............. 180/274 |
| 7,172,048 | B2 * | 2/2007 | Hamada et al. ............. 180/274 |
| 2001/0033072 | A1 | 10/2001 | Kumagai et al. |
| 2002/0113416 | A1 | 8/2002 | Uchida |

FOREIGN PATENT DOCUMENTS

| EP | 0 940 302 A1 | 9/1999 |
| EP | 1 122 134 A1 | 8/2001 |
| JP | 56-43890 | 10/1981 |
| JP | 2-74440 | 3/1990 |
| WO | WO 02/079009 A1 | 10/2002 |
| WO | WO-02079009 A1 * | 10/2002 |

* cited by examiner

*Primary Examiner*—Kevin Hurley
*Assistant Examiner*—Joselynn Y. Sliteris
(74) *Attorney, Agent, or Firm*—Fitch, Even, Tabin & Flannery

(57) ABSTRACT

An easily manufacturable airbag and airbag apparatus having such an airbag are provided in which the inflated shape of the airbag is regulated by panels in place of tether belts. The airbag comprises a first panel surrounding a first vacant chamber and a second panel surrounding a second vacant chamber. When manufacturing the airbag, confronting surfaces of panels are placed one on top of the other, and intermediate sections are connected thereto by sewing. Then, peripheral edges are superposed and connected by sewing. Finally, both ends in the extending direction of the peripheral edges are connected together by sewing. The airbag is manufactured by such a procedure. A tether panel is composed by placing confronting surfaces and one on top of the other. A vent port for ensuring communication between vacant chamber and is provided in the tether panel.

9 Claims, 12 Drawing Sheets

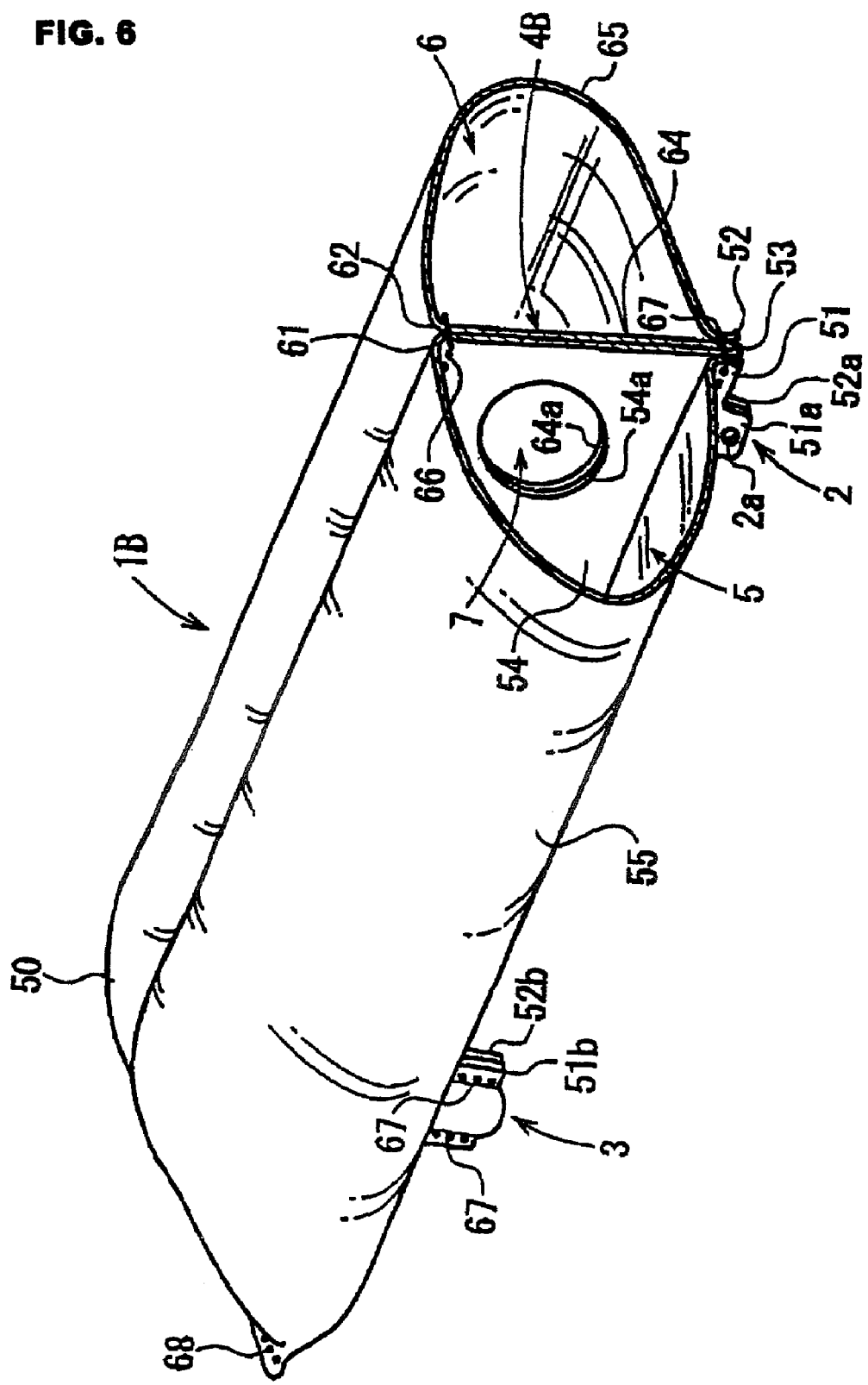

AIRBAG AND AIRBAG APPARATUS

FIELD OF THE INVENTION

The present invention relates to an airbag for protecting passengers of a vehicle, pedestrians and two-wheeler drivers and an airbag apparatus having such an airbag. More particularly, the present invention relates to an airbag having tether means for regulating the inflated shape of the airbag and an airbag apparatus having such an airbag.

BACKGROUND OF THE INVENTION

An airbag apparatus for protecting passengers of a vehicle, pedestrians and two-wheeler drivers has a configuration in which gas generating means generates a gas in emergency such as a collision to considerably inflate the airbag. It is popularly known to provide a tether belt in the airbag to regulate the inflated shape of the airbag (for example, Japanese Examined Patent Application Publication No. 56-43890).

Japanese Unexamined Patent Application Publication No. 2-74440 discloses an airbag having, as a driver's seat airbag which is inflated between a steering wheel and the driver at the driver's seat, a center gas chamber inflated at the center of the steering wheel, and a peripheral gas chamber surrounding the outer periphery of this center gas chamber. By configuring the center portion of the airbag separately from the outer periphery, the center portion of the airbag is prevented from being inflated in projection.

The above-mentioned Japanese Unexamined Patent Application Publication No. 2-74440 does not disclose how an airbag is manufactured from cloth.

SUMMARY OF THE INVENTION

It is an object of the present invention to provide an airbag in which the inflated shape of the airbag is regulated by a panel in place of a tether belt, which is easily manufacturable, and an airbag apparatus having such an airbag.

In the airbag of the present invention, which is inflated along the vehicle body surface, the surface of the airbag facing the body surface and the surface parting from the body surface upon inflation are connected by a tether panel. The tether panel is integral with the airbag main body forming the outer shell of the airbag, and a vent hole for communicating two vacant chambers on both sides of the tether panel is provided in the tether panel.

The airbag apparatus of the present invention comprises such an airbag of the present invention, and gas generating means which inflates the airbag.

In the airbag of the present invention, the surface facing the vehicle body surface and the surface parting from the body surface are connected by the tether panel. Upon inflation of the airbag, therefore, the airbag is prevented from expanding in projection from the body surface.

The tether panel is integral with the airbag main body forming the outer shell of the airbag. The airbag of the present invention is therefore easily manufacturable.

Since the vent hole communicating with the two vacant chambers on both sides of the tether panel is provided, inflation takes place so that these vacant chambers have the same inner pressure.

In an embodiment (first embodiment) of the present invention, the airbag comprises a first panel 10 having a first peripheral edge 11 and a second peripheral edge arranged substantially in parallel with each other and an intermediate section 13 extending substantially in parallel with these peripheral edges 11 and 12 between the peripheral edges 11 and 12; the intermediate section 13 being positioned closer to the first peripheral edge 11 than the second peripheral edge 12; the interface between the first peripheral edge 11 and the intermediate section 13 forms a confronting surface 14; the interface between the second peripheral edge 12 and the intermediate section 13 forms a parting surface 15; and a second panel 20 having a first peripheral edge 21 and a second peripheral edge 22 arranged substantially in parallel with each other and an intermediate section 23 extending substantially in parallel with these peripheral edges 21 and 22 between the peripheral edges 21 and 22, the intermediate section 23 being positioned closer to the first peripheral edge 21 than the second peripheral edge 22, and the interface between the first peripheral edge 21 and the intermediate section 23 forming a confronting surface 24, the interface between the second peripheral edge 22 and the intermediate section 23 forming a parting surface 25. In the first panel 10, the first peripheral edge 11 and the second peripheral edge 12 are placed one on top of the other. In the second panel 20, the first peripheral edge 21 and the second peripheral edge 22 are placed one on top of the other. In the first panel 10 and the second panel 20, the confronting surfaces 14 and 24 are placed one on top of the other. The peripheral edges 11 and 12 of the first panel 10 and the peripheral edges 21 and 22 of the second panel 20 are placed one on top of the other and integrally connected. The intermediate section 13 of the first panel 10 and the intermediate section 23 of the second panel 20 are connected. Both sides of the panels 10 and 20 are connected, respectively. As a result, a first vacant chamber is formed between the confronting surface 14 and the parting surface 15 of the first panel 10, and a second vacant chamber is formed between the confronting surface 24 and the parting surface 25.

Such an airbag is manufactured by connecting by sewing the peripheral edges 11, 12, 21 and 22, connecting by sewing the intermediate sections 13 and 23, and connecting by sewing both sides of the airbag (i.e., the extending-direction ends of the individual peripheral edges 11, 12, 21 and 22), respectively. This airbag can be easily connected by sewing.

In another embodiment (second embodiment) of the present invention, the airbag comprises a first panel 30 having a first peripheral edge 31 and a second peripheral edge 32 arranged substantially in parallel with each other, and an intermediate section 33 extending substantially in parallel with these peripheral edges 31 and 32 between these peripheral edges 31 and 32, the intermediate section 33 being closer to the first peripheral edge 31 than the second peripheral edge 32, and the interface between the first peripheral edge 31 and the intermediate section 33 forming a confronting surface 34, the interface between the second peripheral edge 32 and the intermediate section 33 forming a parting surface; and a second panel 40 having a first peripheral edge 41 and a second peripheral edge 42 arranged substantially in parallel with each other. In this airbag, the first peripheral edge 31 and the second peripheral edge 32 of the first panel, and the second peripheral edge 42 of the second panel 40 are placed one on the top of the other and integrally connected. The intermediate section 33 of the first panel and the first peripheral edge 41 of the second panel 40 are connected. Both ends of the panels 30 and 40 are connected, respectively. As a result, a first vacant chamber is formed between the confronting surface 34 and the parting surface 35 of the first panel 30, and a second vacant chamber is formed between the same panel 40 and the confronting surface 34 of the first panel 30.

This airbag is manufactured by connecting by sewing the peripheral edges 31, 32 and 42, connecting by sewing the intermediate section 33 and the peripheral edge 41, and connecting by sewing both ends of the airbag.

In still another embodiment (third embodiment) of the present invention, the airbag comprises a panel 50 having a first peripheral edge 51 and a second peripheral edge 52 arranged substantially in parallel with each other, an intermediate section 53 extending between these peripheral edges 51 and 52 substantially in parallel with these peripheral edges 51 and 52, a first halfway section 61 extending between the intermediate section 53 and the first peripheral edge 51 substantially in parallel therewith, and a second halfway section 62 extending between the intermediate section 52 and the second peripheral edge 52 substantially in parallel therewith; the first halfway section 61 being closer to the intermediate section 53 than the first peripheral edge 51; the interface between the first halfway section 61 and the intermediate section 53 forming a confronting surface 54; the interface between the first peripheral edge 51 and the first halfway section 61 forming a parting surface 55; the second halfway section 62 being closer to the intermediate section 53 than the second peripheral edge 52; the interface between the second halfway section 62 and the intermediate section 53 forming a confronting surface 64; and the interface between the second peripheral edge 52 and the second halfway section 62 forming a parting surface 65. The first peripheral edge 51, the second peripheral edge 52, and the intermediate section 53 are placed one on top of the other and integrally connected; the first halfway section 61 and the second halfway section 62 are placed one on top of the other and integrally connected; and both ends of the panel 50 is connected, respectively. As a result, a first vacant chamber is formed between the confronting surface 54 and the parting surface 55; and a second vacant chamber is formed between the confronting surface 64 and the parting surface 65.

This airbag is manufactured by connecting by sewing the peripheral edges 51 and 52 and the intermediate section 53, connecting by sewing the first and second halfway sections 61 and 62, and connecting by sewing both ends of the airbag.

Particularly, since, in the airbag of the third embodiment, the outer shell portion of the airbag and the tether portion can be configured with a single panel, manufacture is easier.

In the present invention, a vent port may be provided in all the confronting surfaces to ensure communication between the vacant chambers. This permits inflation so as to achieve a uniform inner pressure in the both vacant chambers.

BRIEF DESCRIPTION OF THE DRAWINGS

FIG. 6 is a sectional perspective view of the airbag of an embodiment.

DETAILED DESCRIPTION OF THE PREFERRED EMBODIMENT

Figure 1:
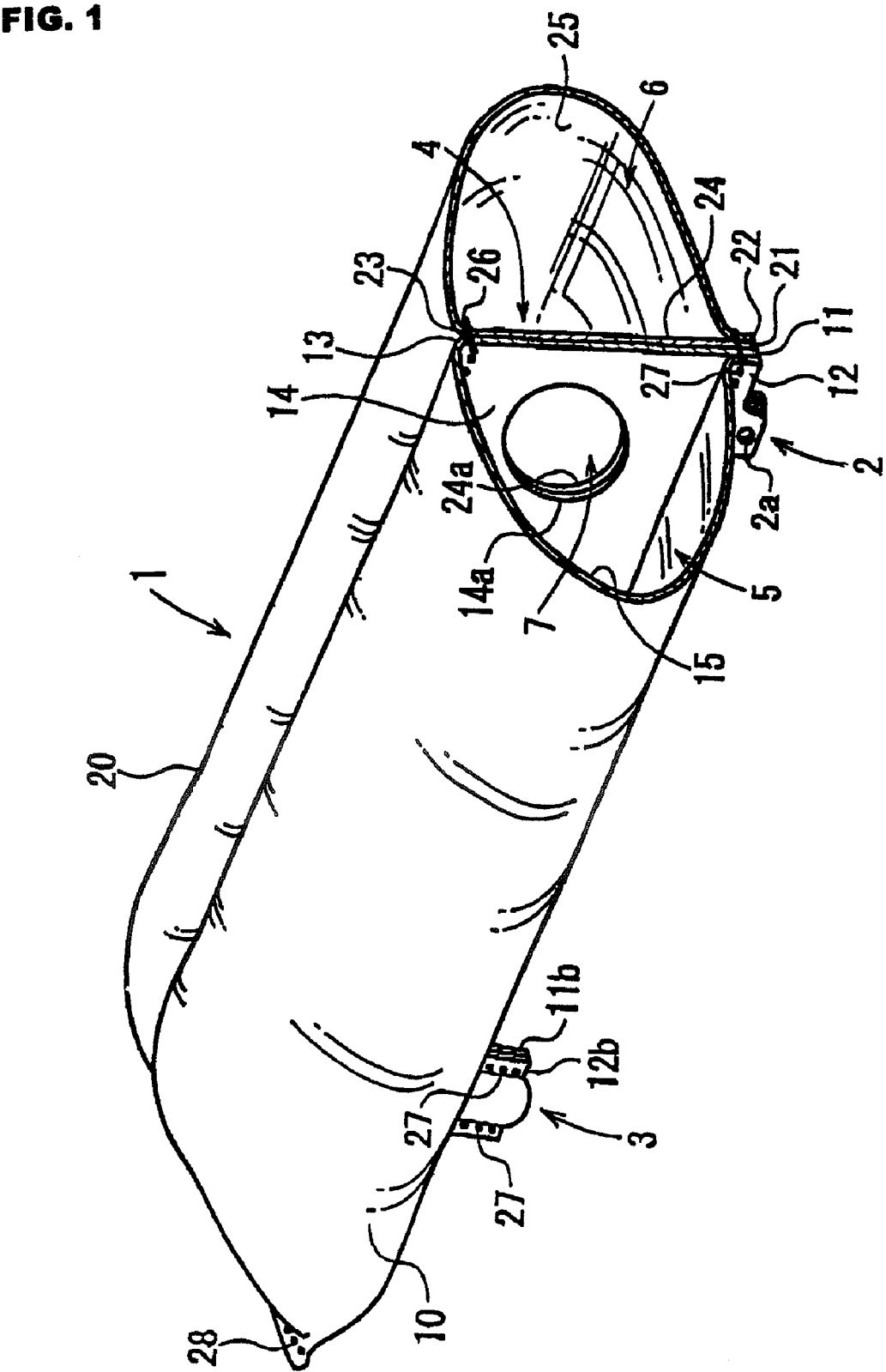
FIG. 1 is a sectional perspective view of the airbag of an embodiment of the present invention.
Figure 2:
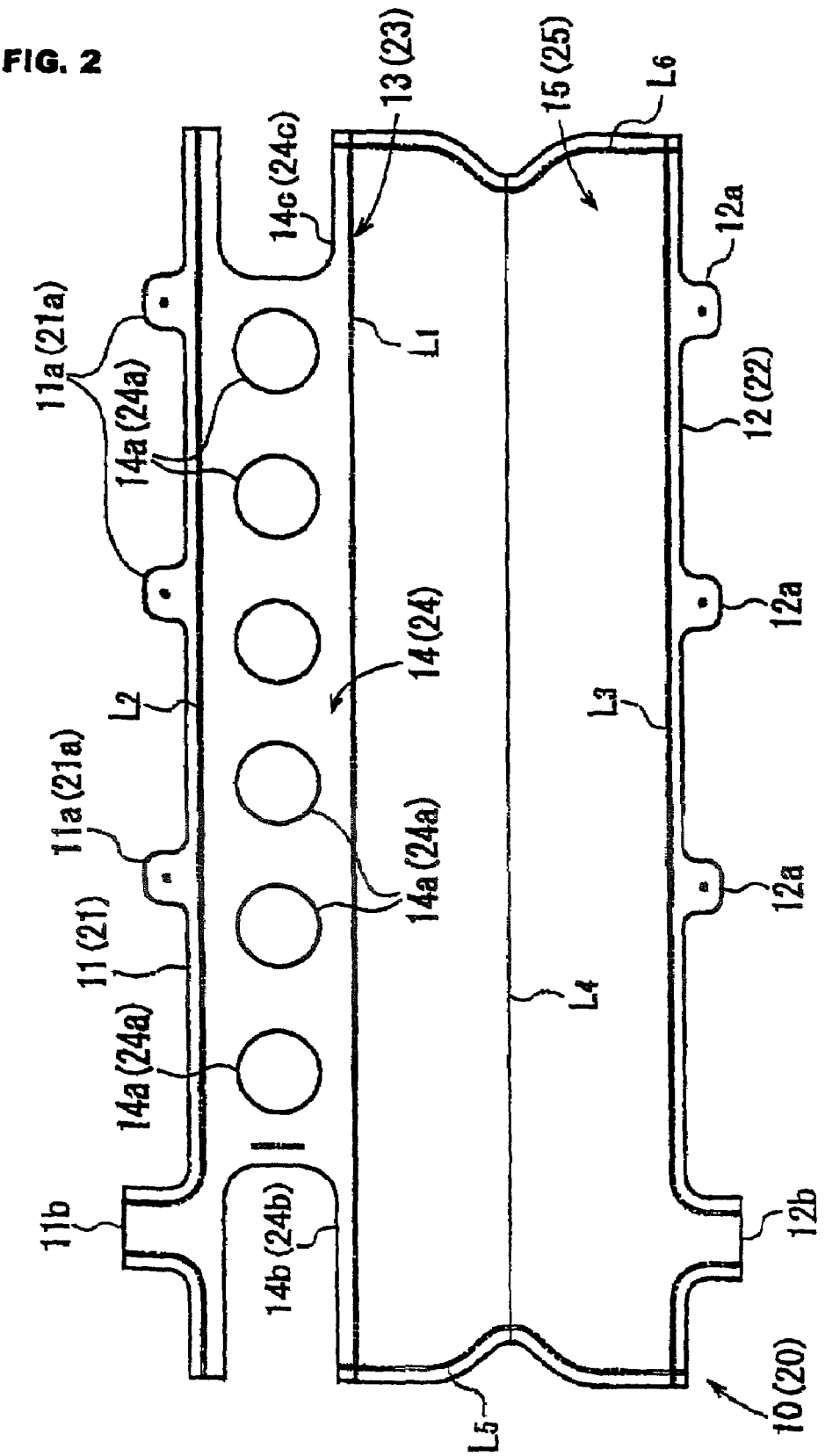
FIG. 2 is a plan view of the panel composing the airbag shown in FIG. 1.

Embodiments of the present invention will now be described with reference to the drawings. FIG. 1 is a sectional perspective view of the airbag of an embodiment; FIG. 2 is a plan view illustrating the panel composing this airbag; and FIGS. 3(*a*) and 3(*b*) are sectional perspective views illustrating the manufacturing procedure of this airbag.

The airbag 1 is a long and narrow bag inflatable so as to cover the outer surface of the body of the A-pillar (not shown) of the vehicle. The airbag apparatus comprises this airbag 1, and gas generating means such as an inflator (not shown) for inflating the airbag 1. In this airbag apparatus, the airbag 1 is arranged, in the normal state (the vehicle is not suffering from an emergency such as a collision), in a form folded flat and arranged so as to extend substantially vertically along the A-pillar, and is covered by a cover (not shown) attached to the A-pillar. Upon inflation of the airbag 1, the cover has a configuration allowing inflation of the airbag 1 to burst the cover.

A plurality of projections 2 for fixing the airbag 1 to the A-pillar are provided on the surface facing the A-pillar of the airbag 1 (lower surface in FIG. 1). A fixing tool such as a bolt (not shown) is inserted into a hole 2*a* of this projection 2, and the fixing tool is secured to the A-pillar, thereby fixing the airbag 1 to the A-pillar. A cylindrical duct 3 for introducing a gas for inflation into the airbag 1 is provided in projection on the surface of the airbag facing the A-pillar, and the above-mentioned gas generating means is connected to this duct 3.

In the airbag 1, a tether panel 4 connects the surface of the airbag facing the outer surface of the vehicle body (upper surface in FIG. 1) and the surface facing the A-pillar for the purpose of regulating outside expansion of the surface of the airbag 1 facing the outer surface of the body upon inflation. The tether panel 4 extends to longitudinally travel the airbag 1 near the center in the width direction of the airbag 1. The interior of the airbag 1 is divided by the tether panel 4 into a first vacant chamber 5 and a second vacant chamber 6. In this embodiment, a vent port 7 is provided in the tether panel 4 to allow communication between these vacant chambers 5 and 6.

The airbag 1 is composed of a first panel 10 surrounding the first vacant chamber 5 and a second panel 20 surrounding the second vacant chamber 6.

As shown in FIG. 2, the first panel 10 is a substantially rectangular panel in this embodiment, and has a first peripheral edge 11 and a second peripheral edge 12 substantially in parallel with each other, and an intermediate section 13 extending between these peripheral edges 11 and 12 substantially in parallel with these peripheral edges 11 and 12. The intermediate section 13 is positioned closer to the first peripheral edge 11 than the second peripheral edge 12. The interface between the first peripheral edge 11 and the intermediate section 13 forms a confronting surface 14. The interface between the second peripheral edge 12 and the intermediate section 13 forms a parting surface 15. The parting surface 15 serves as the outer shell of the first vacant chamber 5.

The confronting surface 14 is placed on the confronting surface 24 of the second panel 20 described later one on top of the other to form the tether panel 4. An opening 14a serving as a vent hole 7 is provided in this confronting surface 14. Notch-type concavities 14b and 14c are formed at both ends in the longitudinal direction of the confronting surface 14.

As shown in FIG. 2, small projections 11a and 12a forming the projections 2 for fixing the airbag and duct halves 11b and 12b serving as circumferential halves of the duct 3 are provided on the first peripheral edge 11 and the second peripheral edge 12. These small projections 11a and 12a, and the duct halves 11b and 12b are arranged to be placed one on top of the other when the first peripheral edge 11 and the second peripheral edge 12 are placed one on top of the other by folding the first panel 10 at the intermediate section 13.

The second panel 20 has substantially the same configuration (shape and size) as the first panel 10 except that the face and back are reversed from the first panel 10. That is, the second panel 20 has also a first peripheral edge 21 and a second peripheral edge 22 substantially in parallel with each other, and an intermediate section 23 extending substantially in parallel with these peripheral edges 21 and 22 therebetween. The intermediate section 23 is positioned closer to the first peripheral edge 21 than the second peripheral edge 22. The interface between the first peripheral edge 21 and the intermediate section 23 forms a confronting surface 24. The interface between the intermediate section 23 and the second peripheral edge 22 forms a parting surface 25. The parting surface 25 serves as the outer shell of the second vacant chamber 6.

As described above, the confronting surface 24 and the confronting surface 14 of the first panel 10 are placed on top of the other and form the tether panel 4. An opening 24a concentrically aligned with the above-mentioned opening 14a of the confronting surface 14 when superposing the confronting surface 14 is provided in the confronting surface 24. These openings 14a and 24a form a vent port 7 for ensuring communication between the first vacant chamber 5 and the second vacant chamber 6. A plurality of these openings 14a and 24a are provided at intervals in the longitudinal direction of the confronting surfaces 14 and 24. Notch-shaped concavities 24b and 24c are formed, as in the confronting surface 14, at both ends of the confronting surface 24.

Also in this second panel 20, small projections 21a and 22a similar to the small projections 11a and 12a provided on the first and second peripheral edges 11 and 12 of the first panel 10 are provided. In this second panel 20, however, duct halves forming the duct 3 from the first and second peripheral edges 21 and 22 are not provided.

A plurality of the small projections 11a, 12a, 21a and 22a are provided at intervals in the longitudinal direction of these peripheral edges 11, 12, 21 and 22, respectively, and are arranged so as to lap each other when these peripheral edges 11, 12, 21 and 22 are placed one on top of the other. These small projections 11a, 12a, 21a and 22a are placed one on top of the others to form projection 2 for fixing the airbag.

Figure 3A:
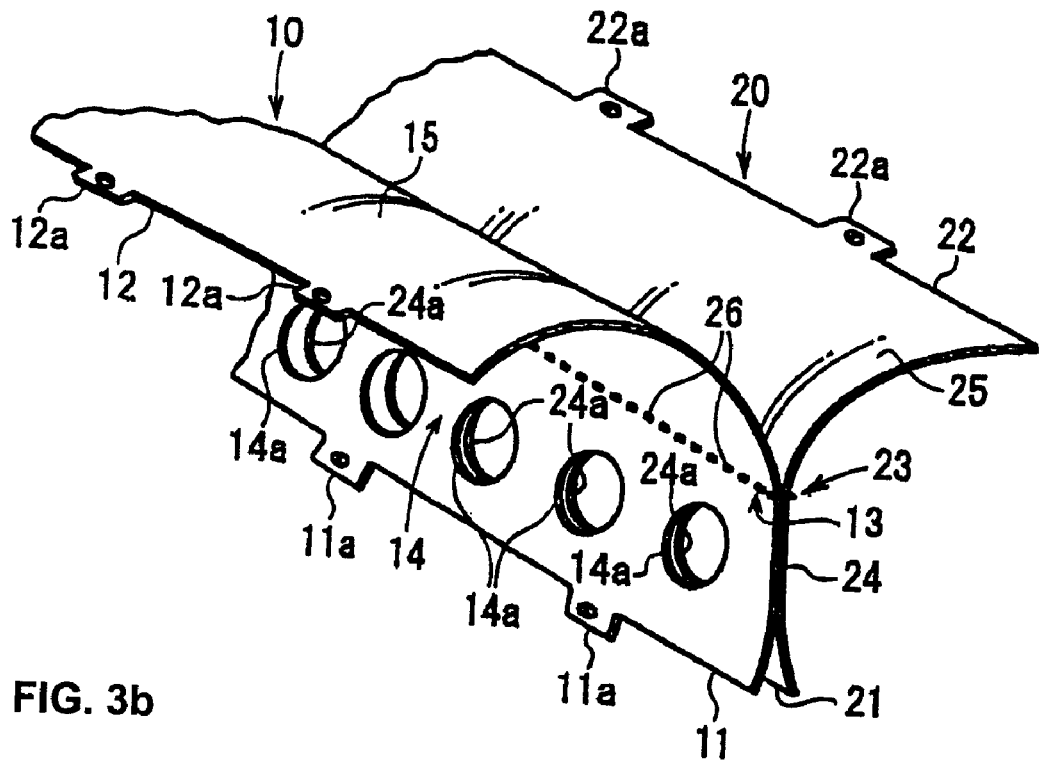
FIGS. 3(*a*) and 3(*b*) are descriptive views of the manufacturing procedure of the airbag shown in FIG. 1.

When manufacturing the airbag 1 from the panels 10 and 20 having the above-mentioned configurations, first as shown in FIG. 3(a), the confronting surfaces 14 and 24 of the first panel 10 and the second panel 20 are placed one on top of the other. Then, the intermediate sections 13 and 23 of the first panel 10 and the second panel 20 are connected by sewing along a connecting line $L_1$ shown by a two-point chain line in FIG. 2. Reference numeral 26 represents a seam comprising the sewing thread connecting these intermediate sections 13 and 23.

Then, the parting surfaces 15 and 25 of the first panel 10 and the second panel 20 are folded to part from each other, and the first and second peripheral edges 11 and 12 are placed one on top of the other for the first panel 10, and the first and second peripheral edges 21 and 22, for the second panel 20. The peripheral edges 11 and 12 of the first panel 10 and the peripheral edges 21 and 22 of the second panel 20 are integrally connected by sewing along the connecting lines $L_2$ and $L_3$ shown in FIG. 2. Reference numeral 27 represents the seam of integral connection of these peripheral edges 11, 12, 21 and 22.

The seam 27 (connecting lines $L_2$ and $L_3$) extends along the sides of the duct halves 11b and 12b by changing the course at right angles outward from the peripheral edges 11, 12, 21, and 22 near the duct halves 11b and 12b, to connect the sides of the duct halves 11b and 12b. This forms a cylindrical duct 3 communicating with the interior of the first vacant chamber 5 surrounded by the first panel 10.

The seam 27 does not connect the peripheral edges 21 and 22 of the second panel 20, on the one hand, and these peripheral edges 21 and 22 and the peripheral edge 11 of the first panel 10 near the duct halves 11b and 12b. In this portion, therefore, these peripheral edges 11, 21 and 22 are previously connected by another seam (not shown). However, only these peripheral edges 11, 21, and 22 may be connected in advance over the entire length, and the member formed by connection of these peripheral edges 11, 21 and 22 may be placed over the peripheral edge 12 for integral connection.

Thereafter, the parting surfaces 15 and 25 are folded near the center in the shorter-side direction (perpendicular to the longitudinal direction of the airbag 1 product) along the folding line $L_4$ into two. At both ends of these parting surfaces 15 and 25, one half and the other half are placed one on top of the other from the respective folding line $L_4$ and connected by sewing them along the connecting lines $L_5$ and $L_6$. Reference numeral 28 represents the seam for this connection.

As a result, the first vacant chamber 5 is formed between the confronting surface 14 and the parting surface 15 of the first panel 10, and the second vacant chamber 6 is formed between the confronting surface 24 and the parting surface 26 of the second panel 20, thereby completing the airbag 1.

As described above, this airbag 1 is arranged so as to extend vertically along the A-pillar, and secured to the A-pillar via the projection 2. The gas generating means such as an inflator is connected to the duct 3, and housed in the pillar in a flat-folded state.

In the airbag apparatus having this airbag 1, when the vehicle encounters an emergency such as a collision, a gas is introduced from the gas generating means through the duct 3 into the first vacant chamber 5, and inflation of the airbag 1 is started. The gas introduced into the first vacant chamber 5 is fed to the second vacant chamber 6 via the vent port 7 of the tether panel 4. Therefore, the first vacant chamber 5 and the second vacant chamber 6 are inflated substantially uniformly.

The airbag 1 is inflated so as to cover the outer surface of the A-pillar body, and protect pedestrians. The tether panel 4 regulates expansion of the airbag 1 to prevent the airbag 1 from expanding in excessive projection.

In this airbag 1, when manufacturing the airbag 1, the intermediate sections 13 and 23 of the panels 10 and 20 are connected by sewing, and then, the peripheral edges 11, 12, 21 and 22 are connected by sewing to each other. Finally, both ends of the airbag (that is, both ends in of extending direction of the peripheral edges 11, 12, 21 and 22) are connected by sewing, respectively. Since the airbag 1 is manufactured in this procedure, sewing connection is easy for all the portions.

Figure 4:
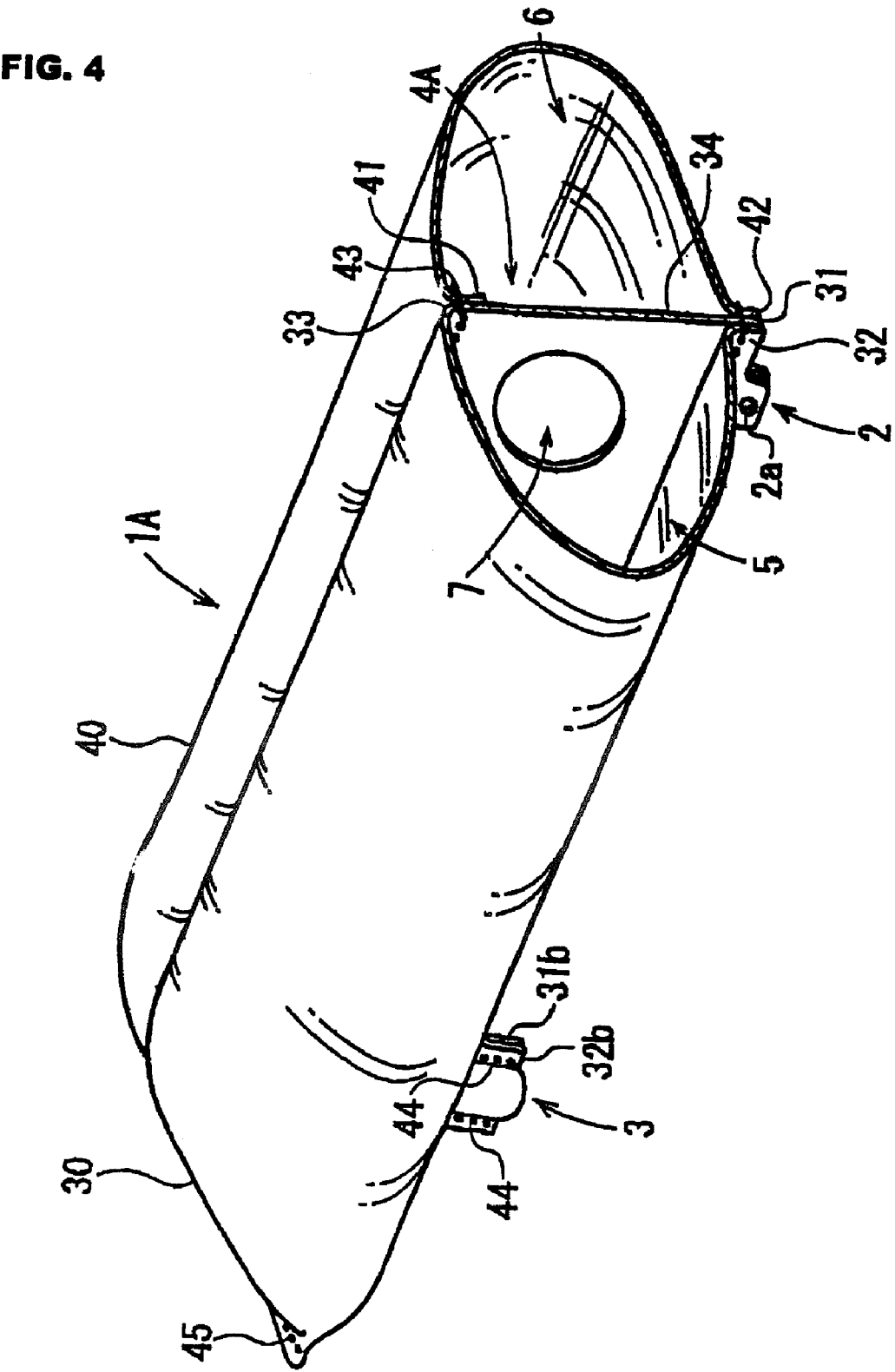
FIG. 4 is a sectional perspective view of an embodiment.
Figure 5A:
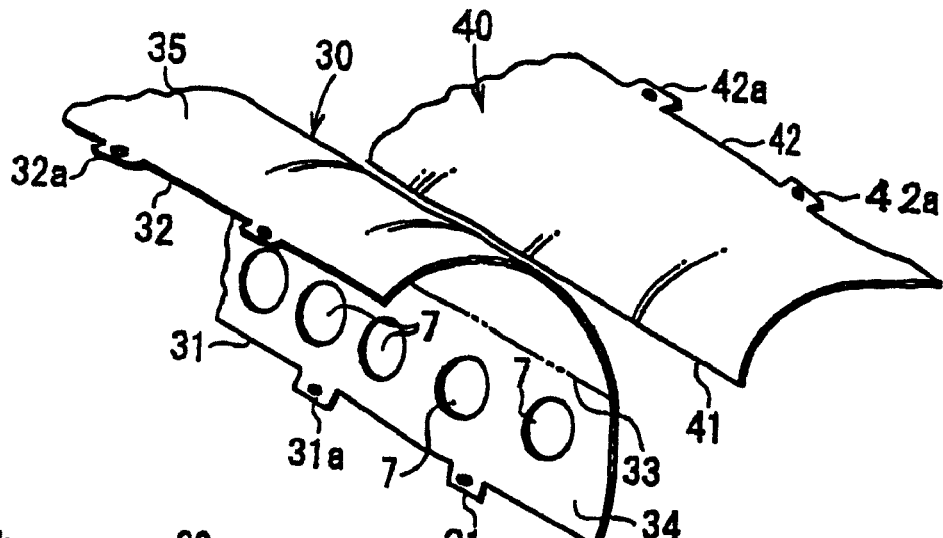
FIGS. 5(*A*)-5(*c*) are descriptive views of the manufacturing procedure shown in FIG. 4.
Figure 5B:
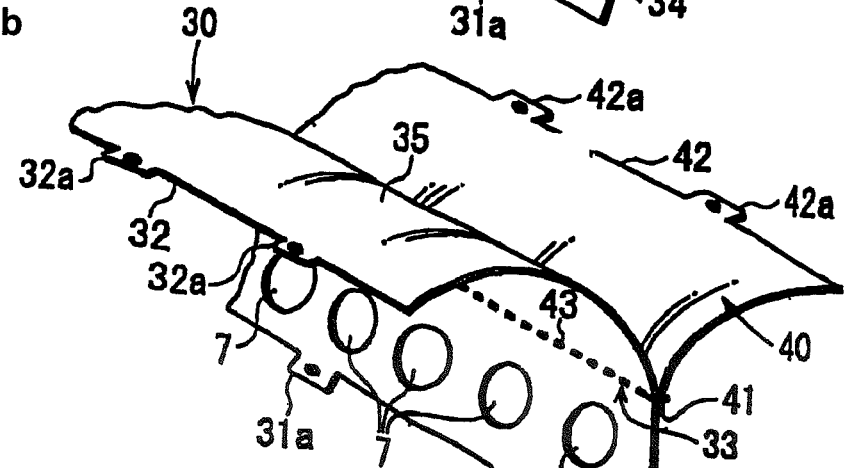
Figure 5C:
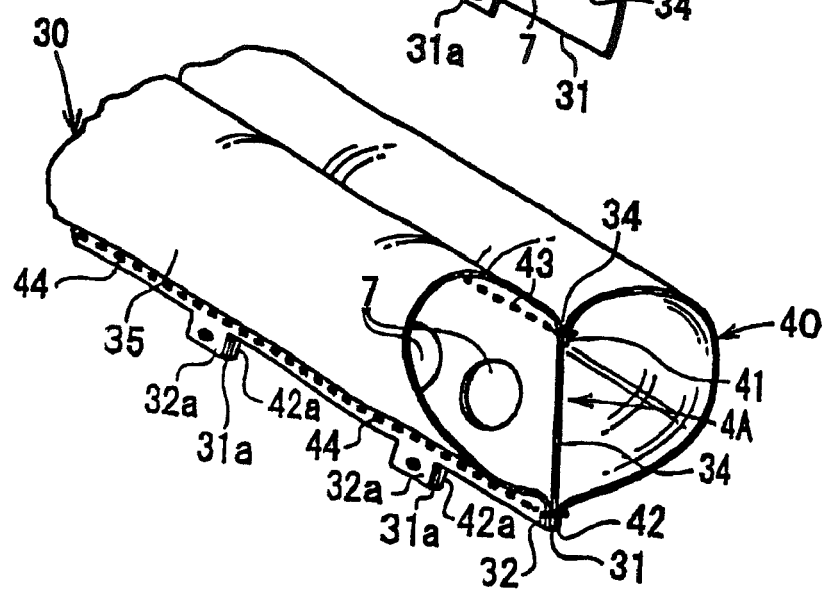

FIG. 4 is a sectional perspective view of the airbag 1A of another embodiment; FIGS. 5(a), 5(b) and 5(c) are sectional perspective views illustrating the manufacturing procedure of the airbag.

Figure 3B:
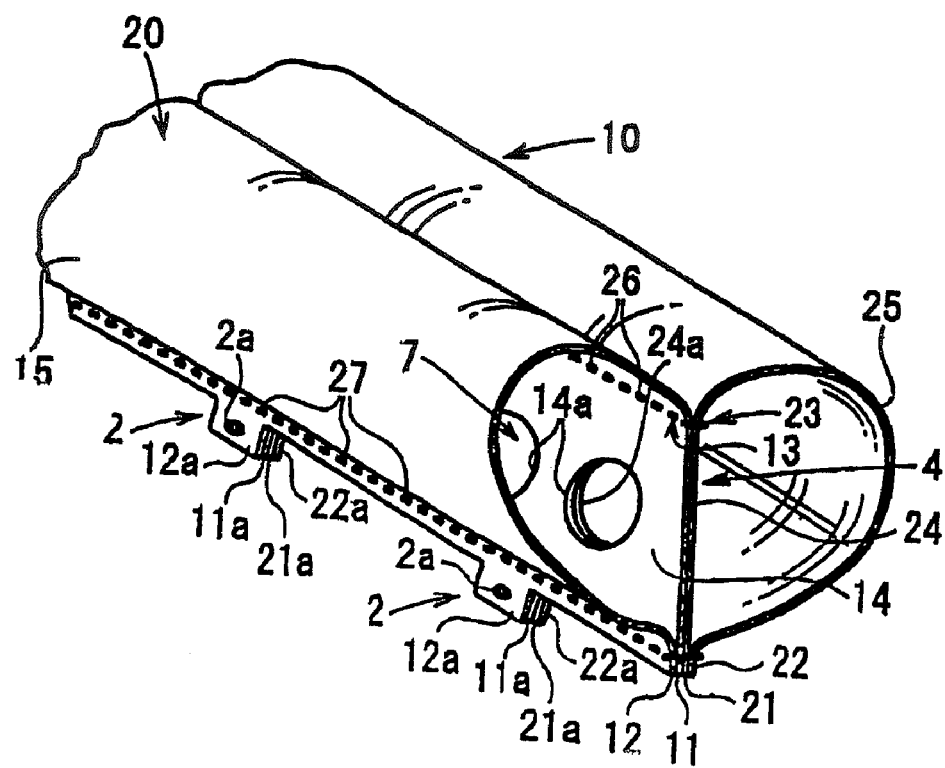

This airbag 1A is, as the airbag 1 shown in FIGS. 1 to 3, a long and narrow bag inflatable so as to cover the A-pillar of the vehicle. In this airbag 1A also, a projection 2 for fixing the airbag 1A to the A-pillar and a cylindrical duct 3 for introducing a gas into the airbag 1A are projected from the surface facing the A-pillar surface (lower surface in FIG. 4). In this embodiment too, the surface of the airbag 1A facing the outer surface of the body and the surface facing the A-pillar are connected by a tether panel 4A.

As in the case of the tether panel 4 in the embodiment shown in FIGS. 1 to 3, the tether panel 4A extends so as to longitudinally cross the airbag 1A near the center in the width direction of the airbag 1A. The tether panel 4A divides the interior of the airbag 1A into a first vacant chamber 5 and a second vacant chamber 6. A vent port 7 for ensuring communication between the vacant chambers 5 and 6 is provided in this tether panel 4A.

The airbag 1A is composed of a first panel 30 surrounding the first vacant chamber 5 and a second panel 40 surrounding the second vacant chamber.

In this embodiment, the first panel 30 has the same configuration as that of the first panel 10 in the embodiment shown in FIGS. 1 to 3, as shown in FIG. 5(a). In other words, the first panel 30 also comprises a first peripheral edge 31 and a second peripheral edge 32 substantially in parallel with each other, and an intermediate section 33 extending substantially in parallel with these peripheral edges 31 and 32 therebetween. The intermediate section 33 is positioned closer to the first peripheral edge 31 than the second peripheral edge 32. The interface between the peripheral edge 31 and the intermediate section 33 forms a confronting surface 34, and the interface between the second peripheral edge 32 and the intermediate section 33 forms a parting surface 35.

In the airbag 1A product, the confronting surface 34 forms the above-mentioned tether panel 4A. The vent port 7 is provided in this confronting surface 34. The parting surface 35 forms the outer shell of the first vacant chamber 5.

In this embodiment also, small projections 31a and 32a forming a projection 2 for fixing the airbag are provided on the first and second peripheral edges 31 and 32, and duct halves 31b and 32b forming circumferential halves of the duct 3 are provided.

In the second panel 40, the confronting surface 34 is omitted from the first panel 30, and the second panel 40 has a shape composed of only the parting surface 35. More specifically, as shown in FIG. 5(a), the second panel 40 is substantially a rectangular panel having a first peripheral edge 41 and a second peripheral edge 42. The interval between these peripheral edges 41 and 42 is substantially equal to the interval between the second peripheral edge 32 and the intermediate section 33 of the first panel 30. A small projection 42a composing a projection 2 for fixing the airbag is provided in projection on the second peripheral edge 42. This second panel 40 serves as the outer shell of the second vacant chamber 6.

The above-mentioned small projections 31a, 32a and 42a and the duct halves 31b and 32b have configurations (layout and quantity) similar to those of the small projections 11a, 12a, 21a and 22a and the duct halves 11b and 12b in the embodiment shown in FIGS. 1 to 3.

When manufacturing the airbag 1A from the panels 30 and 40 having the above-mentioned configurations, the intermediate section 33 of the first panel 30 and the first peripheral edge 41 of the second panel 40 are placed one on top of the other as shown in FIG. 5(a), and are connected by sewing. Reference numeral 43 represents a seam made by a sewing thread which connects the intermediate section 33 and the peripheral edge 41.

Then, the parting surface 35 of the first panel 30 and the second panel 40 are placed so that they part from each other, and the first and second peripheral edges 31 and 32 of the first panel 30 and the second peripheral edge 42 of the second panel 40 replaced one on top of the other and integrally connected by sewing. Reference numeral 44 represents the seam which integrally connects these peripheral edges 31, 32 and 42.

The seam 44 extends along the sides of the duct halves 31b and 32b by changing the course at right angles outward from the peripheral edges 31, 32 and 42 near the duct halves 31b and 32b, to connect the sides of the duct halves 31b and 32b. This forms a cylindrical duct 3 communicating with the interior of the first vacant chamber 5 surrounded by the first panel 30.

The seam 44 does not connect the peripheral edge 42 of the second panel 40, and the peripheral edge 31 of the first panel 30 near the duct halves 31b and 32b. In this portion, therefore, these peripheral edges 31 and 42 are previously connected by another seam (not shown). However, only these peripheral edges 31 and 42 may be connected in advance over the entire length, and the member formed by connection of these peripheral edges 31 and 42 may be placed over the peripheral edge 32 by the seam 44 for integral connection.

Thereafter, the parting surface 35 of the first panel 30 and the second panel 40 are folded into two near the center in the shorter-side direction (perpendicular to the longitudinal direction of the airbag 1A product). At both ends of the parting surface 35 and the second panel 40, one half and the other half are placed one on top of the other from the respective folding line and connected by sewing. Reference numeral 45 represents the seam for this connection.

As a result, the first vacant chamber 5 is formed between the confronting surface 34 and the parting surface 35 of the first panel 30, and the second vacant chamber 6 is formed between the confronting surface 34 and the second panel 40, thereby completing the airbag 1A.

The configuration of the components of the airbag 1A is the same as that of the airbag 1 shown in FIGS. 1 to 3. In FIGS. 4 and 5, the same reference numerals represent the same components as in FIGS. 1 to 3.

This airbag 1A is also arranged so as to extend vertically along the A-pillar, and secured to the A-pillar via the projection 2. The gas generating means such as an inflator is connected to the duct 3, and housed in the pillar in a flat-folded state. In the airbag apparatus having this airbag 1A, when the vehicle encounters an emergency such as a collision, a gas is introduced from the gas generating means through the duct 3 into the first vacant chamber 5, and inflation of the airbag 1A is thus started.

In this airbag 1A too, the gas introduced into the first vacant chamber 5 is fed to the second vacant chamber 6 via the vent port 7 of the tether panel 4A. Therefore, the first vacant chamber 5 and the second vacant chamber 6 are inflated substantially uniformly.

In this airbag 1A too, the tether panel 4A regulates expansion of the airbag 1A to prevent the airbag 1A from expanding in excessive projection.

In this airbag 1A, when manufacturing the airbag 1A, the intermediate section 33 of the first panel 30 and the first peripheral edge 41 of the second panel 40 are connected by sewing, the peripheral edges 31, 32 and 42 are connected by sewing to each other. Both ends of these peripheral edges 31, 32 and 42 are connected together by sewing, respectively. Since the airbag 1A is manufactured in this procedure, sewing connection is easy.

Figure 7:
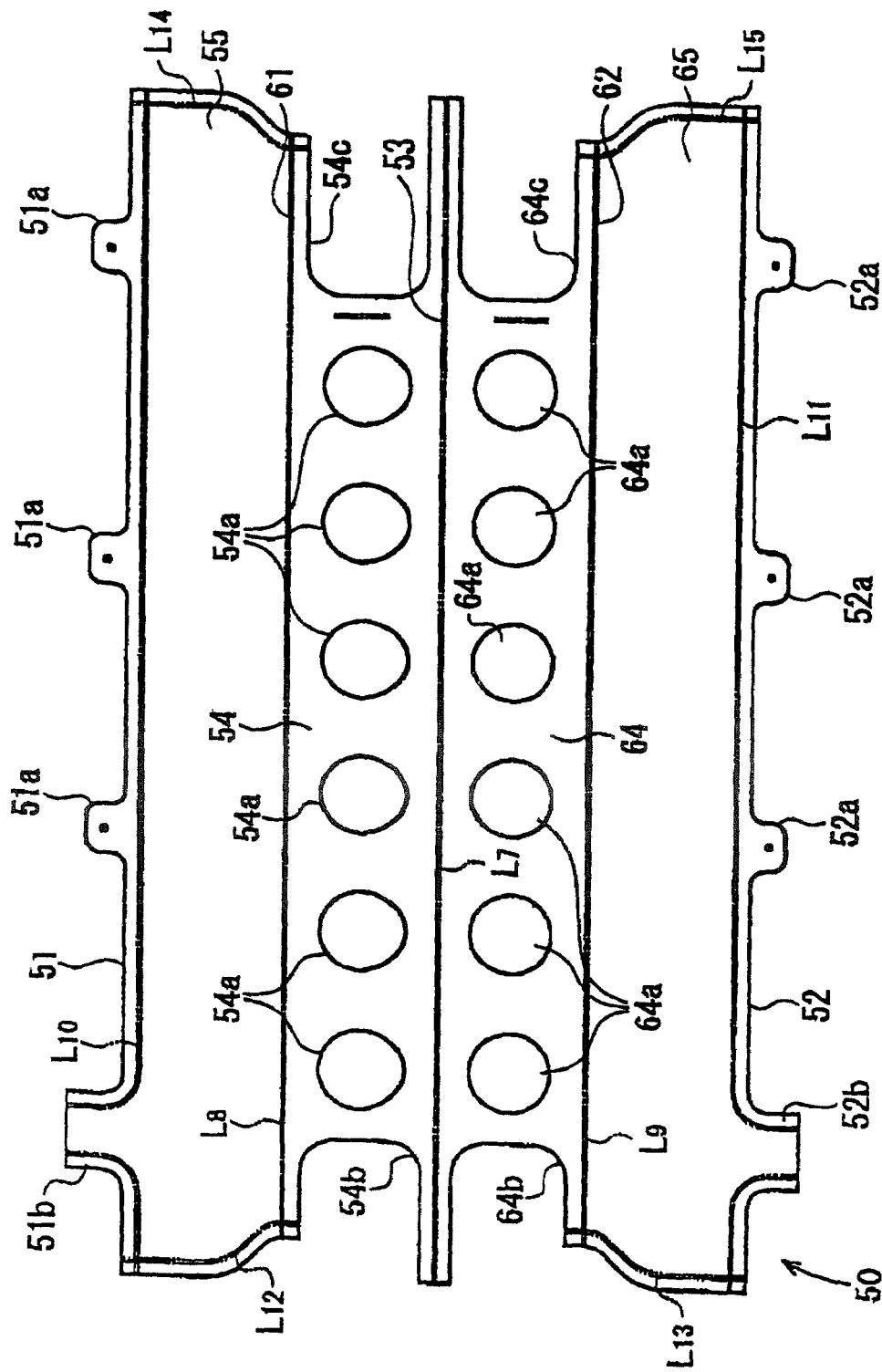
FIG. 7 is a plan view of the panel composing the airbag shown in FIG. 6.
Figure 8A:
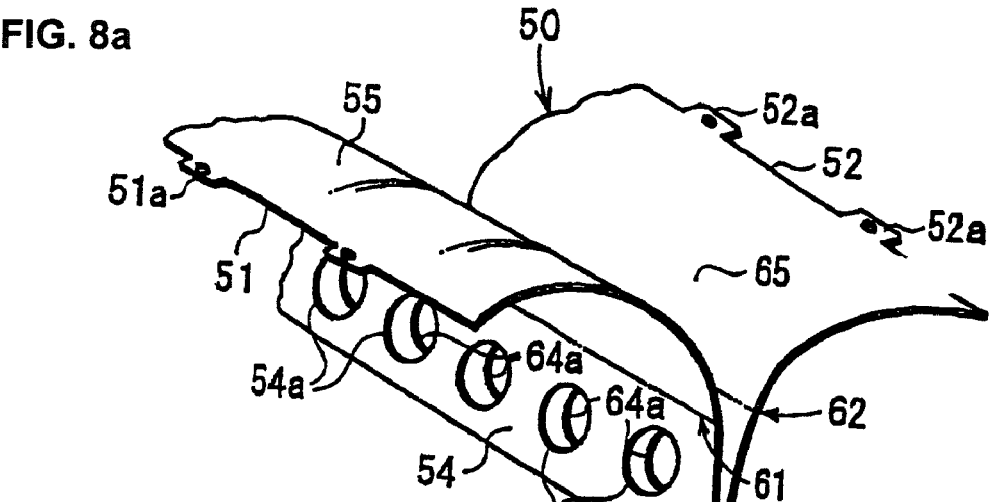
FIGS. 8(*a*)-8(*c*) are descriptive views of the manufacturing procedure shown in FIG. 6.
Figure 8B:
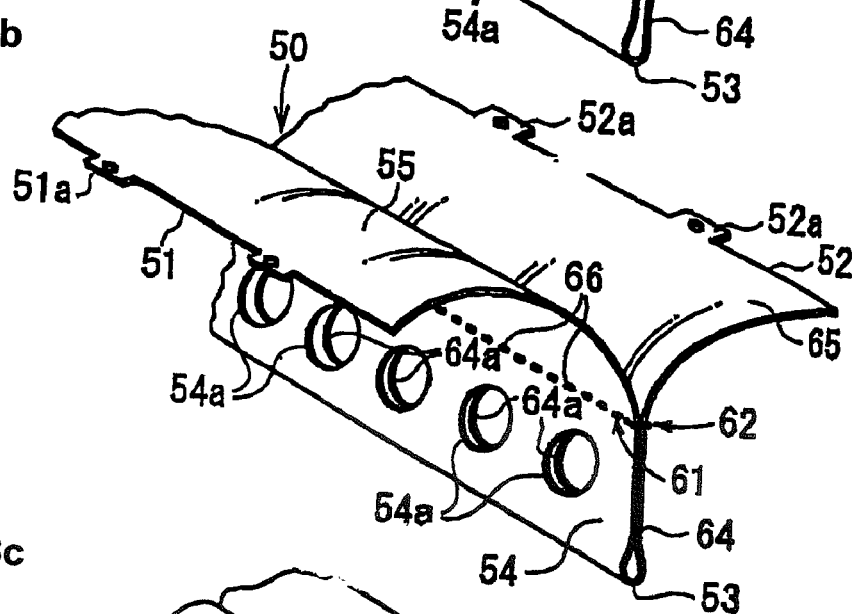
Figure 8C:
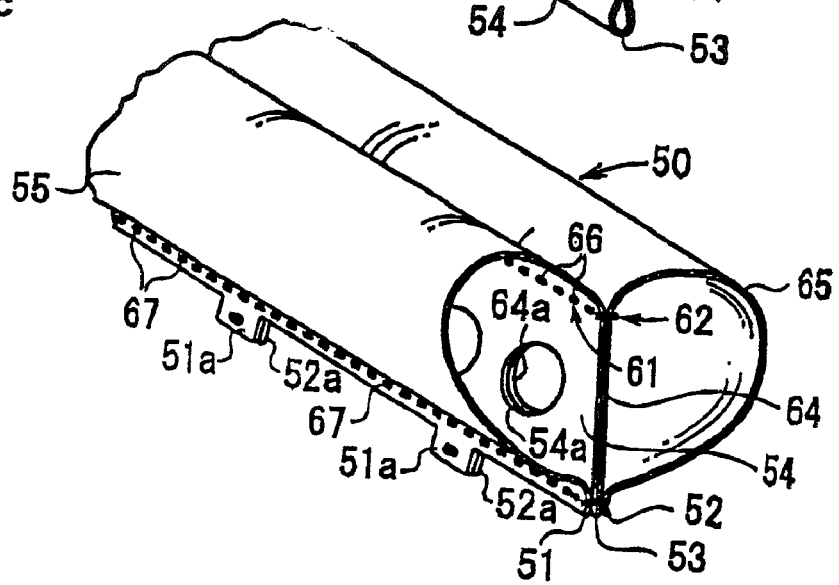

FIG. 6 is a sectional perspective view of the airbag 1B of still another embodiment; FIG. 7 is a plan view of a panel composing this airbag 1B; and FIGS. 8(a), 8(b) and 8(c) are sectional perspective views illustrating the manufacturing procedure of this airbag.

This airbag 1B is, as the airbag 1 shown in FIGS. 1 to 3, a long and narrow bag inflatable so as to cover the A-pillar of the vehicle. In this airbag 1B also, a projection 2 for fixing the airbag 1B to the A-pillar and a cylindrical duct 3 for introducing a gas into the airbag 1B are projected from the surface facing the A-pillar surface (lower surface in FIG. 6). In this embodiment too, the surface of the airbag 1B facing the outer surface of the airbag 1B facing the body and the surface facing the A-pillar are connected by a tether panel 4B.

As in the case of the tether panel 4 in the embodiment shown in FIGS. 1 to 3, the tether panel 4B extends so as to longitudinally cross the airbag 1B near the center in the width direction of the airbag 1B. The tether panel 4B divides the interior of the airbag 1B into a first vacant chamber 5 and a second vacant chamber 6. A vent port 7 for ensuring communication between the vacant chambers 5 and 6 is provided in this tether panel 4B.

The airbag 1B is composed of a single panel 50. The panel 50 is something combining integrally the first panel 10 and the second panel 20 in the embodiment shown in FIGS. 1 to 3.

More specifically, as shown in FIG. 7, this panel 50 has a first peripheral edge 51 and a second peripheral edge 52 substantially in parallel with each other, an intermediate section 53 extending between these peripheral edges 51 and 52 substantially in parallel therewith, a first halfway section 61 extending between the intermediate section 53 and the first peripheral edge 51 substantially in parallel therewith, and a second halfway section 62 extending between the intermediate section 53 and the second peripheral edge 52 substantially in parallel therewith. The first halfway section 61 is positioned closer to the intermediate section 53 than the first peripheral edge 51. The interface between the first halfway section 61 and the intermediate section 53 serves as a confronting surface 54. The interface between the first peripheral edge 51 and the first halfway section 61 serves as a parting surface 55. The second halfway section 62 is positioned closer to the intermediate section 53 than the second peripheral edge 52. The interface between the second halfway section 62 and the intermediate section 53 serves as a confronting surface 64, and the interface between the second peripheral edge 52 and the second halfway section 62 serves as a parting surface 65.

The panel 50 is folded at the intermediate section 53, and the confronting surfaces 54 and 64 are placed one on top of the other, thereby forming the tether panel 4B. Openings 54a and 64a composing the vent port 7 are provided in the confronting surfaces 54 and 64. In this embodiment too, notch-shaped concavities 54d, 54c, 64b and 64c are formed at both ends in the longitudinal direction of the confronting surfaces 54 and 64, respectively. The openings 54a and 64a are arranged so as to be concentrically aligned when the confronting surfaces 54 and 64 are placed one on top of the other. A plurality of these openings 54a and 64a are provided at certain intervals in the longitudinal direction of the confronting surfaces 54 and 64.

In this embodiment, small projections 51a and 52a composing the airbag fixing projection 2 and duct halves 51b and 52b composing the circumferential halves of the duct 3 project from the first peripheral edge 51 and the second peripheral edge 52, respectively. Small projections 51a and 52a and the duct halves 51b and 52b are arranged so as to be aligned when the peripheral edges 51 and 52 are superposed. A plurality of the small projections 51a and 52a are formed at certain intervals in the longitudinal direction of the peripheral edges 51 and 52.

When manufacturing the airbag 1B from the panel 50 having the configuration described above, as shown in FIG. 8(a), the panel 50 is folded at the intermediate section 53 along a folding line $L_7$ into two to place the confronting surfaces 54 and 64 one on top of the other. The first halfway section 61 and the second halfway section 62 are connected by sewing along connecting lines $L_8$ and $L_9$. Reference numeral 66 represents a seam of a sewing thread connecting these halfway sections 61 and 62.

Then, the parting surfaces 55 and 65 are folded so as to cause them to part from each other, and the first and second peripheral edges 51 and 52 are placed over a fold of the intermediate section 53. These peripheral edges 51 and 52 and the intermediate section 53 are integrally connected by sewing along connecting lines $L_{10}$ and $L_{11}$ shown in FIG. 7. Reference numeral 67 represents a seam integrally connecting the peripheral edges 51 and 52 and the intermediate section 53.

In this embodiment too, the seam 68 extends along the sides of the duct halves 51b and 52b by changing the course at right angles outward from the peripheral edges 51 and 52 near the duct halves 51b and 52b to connect the sides of the duct halves 51b and 52b. This forms a cylindrical duct 3 communicating with the interior of the first vacant chamber 5 surrounded by the confronting surface 54 and the parting surface 55.

Therefore, the parting surfaces 55 and 65 are folded into two near the center in the shorter-side direction (perpendicular to the longitudinal direction of the airbag 1B product). At both ends, one half and the other half from the fold are placed one on top of the other and are connected by sewing along connecting lines $L_{12}, L_{13}, L_{14}$ and $L_{15}$. Reference numeral 68 represents the seam for this connection.

As a result, the first vacant chamber 5 is formed between the confronting surface 54 and the parting surface 55, and a second vacant chamber 6 is formed between the confronting surface 64 and the parting surface 65, thus completing the airbag 1B.

The configuration of the other components of the airbag 1B is the same as that of the airbag 1 shown in FIGS. 1 to 3. In FIGS. 6 to 8, the same reference numerals as in FIGS. 1 to 3 represent the same components.

This airbag 1B is arranged so as to extend vertically along the A-pillar, and secured to the A-pillar via the projection 2. The gas generating means such as an inflator is connected to the duct 3, and housed in the pillar in a flat-folded state. In the airbag apparatus having this airbag 1B, when the vehicle encounters an emergency such as a collision, a gas is introduced from the gas generating means through the duct 3 into the first vacant chamber 5, and inflation of the airbag 1B is started.

In this airbag 1B too, the gas introduced into the first vacant chamber 5 is fed also into the second vacant chamber 6 via the vent port 7 of the tether panel 4B. The first vacant chamber 5 and the second vacant chamber 6 are inflated substantially uniformly.

In this airbag 1B too, inflation of the airbag 1B is regulated by the tether panel 4B so as to prevent the airbag 1B from expanding in excessive projection.

In the airbag 1B, when manufacturing the airbag 1B, the panel 50 is folded into two at the intermediate section 53; the halfway sections 61 and 62 are connected by sewing; then, the peripheral edges 51 and 52 and the intermediate section 53 are connected by sewing; and finally, the ends of the peripheral edges 51 and 52 are connected together by sewing. Since the airbag 1B is manufactured in this procedure, sewing of portions can be accomplished easily.

Particularly, manufacture is further easier since, in the manufacture of the airbag 1B, the outer shell of the airbag 1B and the tether panel 4B can be built with a single panel 50.

In the above-mentioned embodiments, the interior of the airbag is divided into two vacant chambers by use of the tether panel provided integrally with the panel serving as an outer shell of the airbag. In the present invention, however, the interior of the airbag may be divided into three or more vacant chambers as in the airbag 1C shown in FIG. 9 or the airbag 1D shown in FIG. 13. In this case, in addition to the tether panel provided integrally with the panel serving as the outer shell of the airbag, a tether panel provided separately from the panel forming the outer shell of the airbag may be arranged in the airbag to divide the interior of the airbag.

Typical configurations of the airbag, the interior of which is divided into three or more vacant chambers will now be described with reference to FIGS. 9 to 16.

Figure 9:
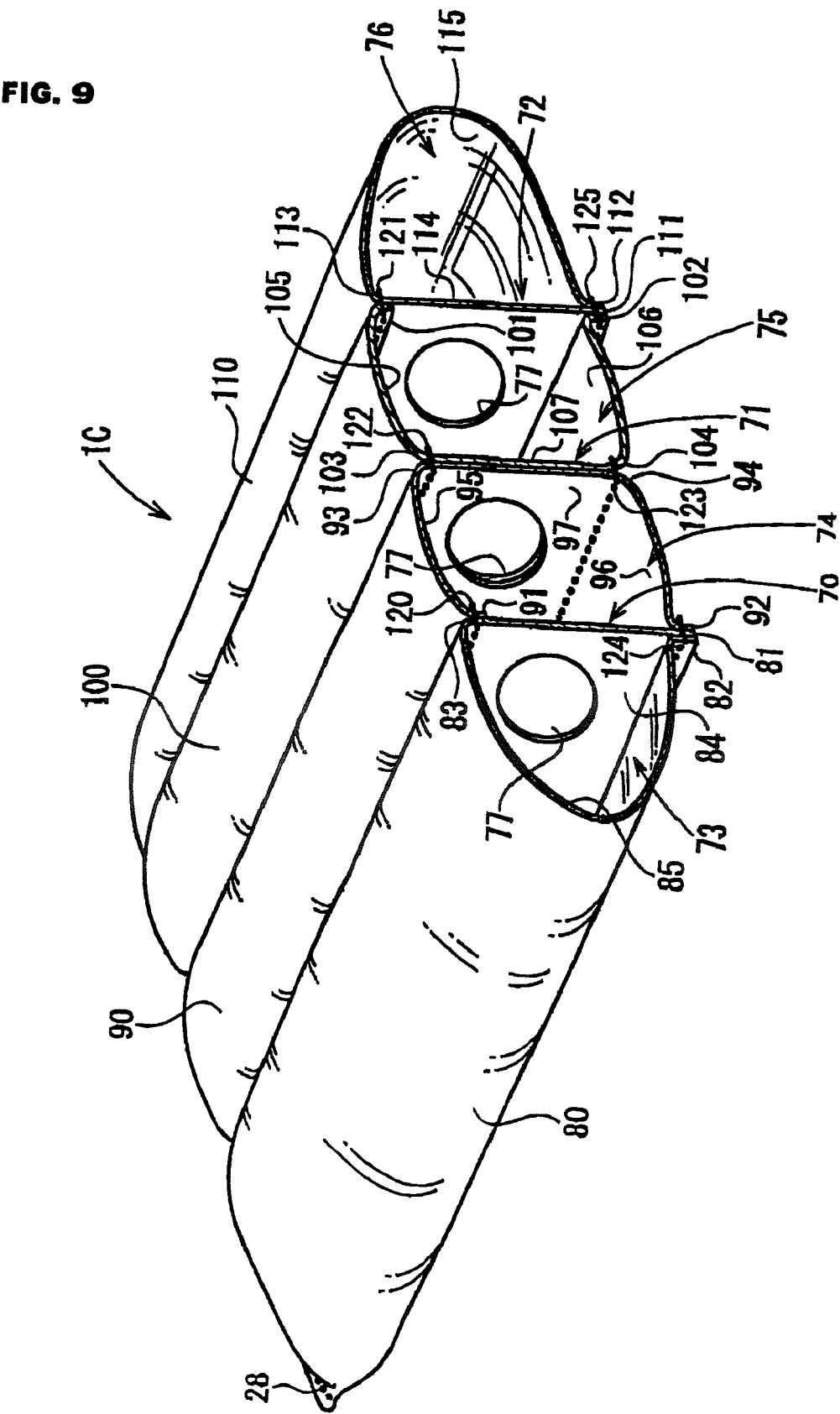
FIG. 9 is a sectional perspective view of the airbag of an embodiment.
Figure 10:
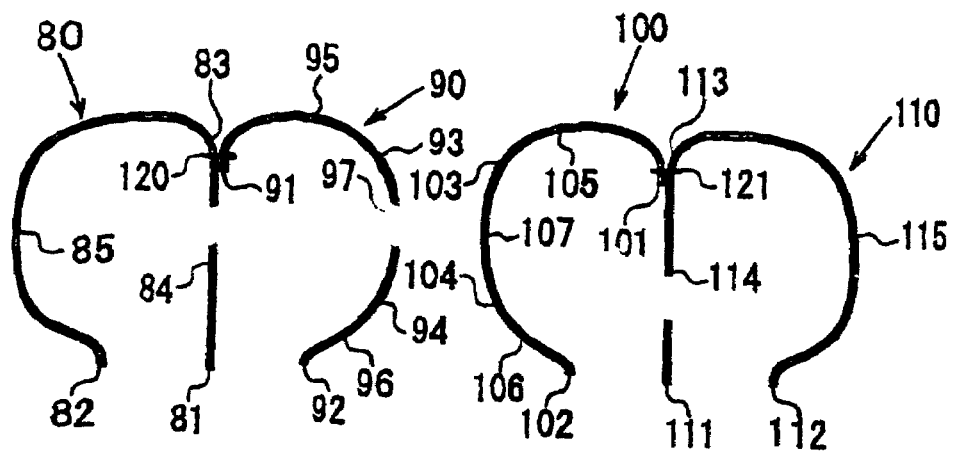
FIG. 10 is a descriptive view of the manufacturing procedure of the airbag shown in FIG. 9.
Figure 11:
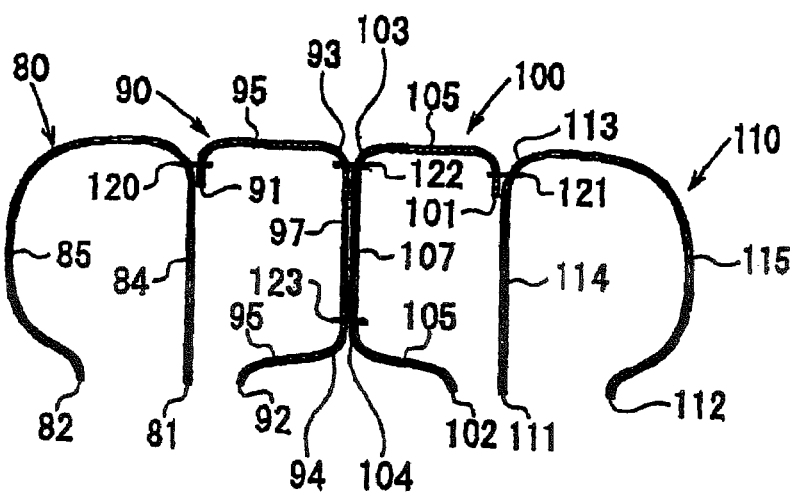
FIG. 11 is a descriptive view of the manufacturing procedure of the airbag shown in FIG. 9.
Figure 12:
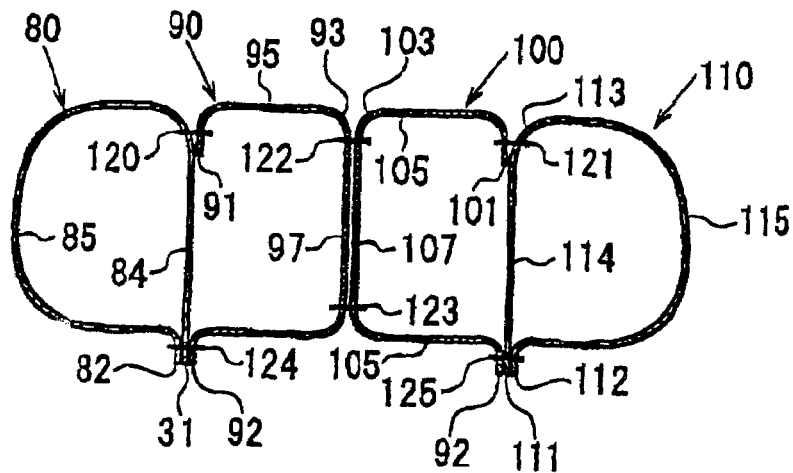
FIG. 12 is a descriptive view of the manufacturing procedure of the airbag shown in FIG. 9.

FIG. 9 is a sectional perspective view of an airbag 10c of further another embodiment; and FIGS. 10 to 12 are descriptive views of the manufacturing procedure of this airbag 10C.

In this embodiment, the interior of the airbag 10C is divided into a first vacant chamber 73, a second vacant chamber 74, a third vacant chamber 75, and a fourth vacant chamber 76 by providing three tether panels including a first tether panel 70, a second tether panel 71, and a third tether panel 72. In this embodiment, all these tether panels 70, 71 and 72 are formed integrally with the panel forming the outer shell of the airbag 10C. These tether panels 70, 71 and 72 are arranged so as to extend in parallel with each other in the extending direction of the airbag 1C. Vent ports 77 are provided in the tether panels 70, 71 and 72 to ensure communication between the vacant chambers 73 and 74, between vacant chambers 74 and 75, and between the vacant chambers 75 and 76.

The airbag 1C has a configuration in which two airbags shown in FIG. 3 are arranged so that the vacant chambers are adjacent in parallel with each other in the transverse direction (perpendicular to the extending direction of each vacant chamber) and surfaces facing each other are connected by sewing.

The configuration and the manufacturing procedure of the airbag 1C will now be described.

The outer shell of the entire airbag 1C comprises a first panel 80 forming the outer shell of the first vacant chamber 73, a second panel 90 forming the outer shell of the second vacant chamber 74, a third panel 100 forming the outer shell of the third vacant chamber 75, and a fourth panel 110 forming the outer shell of the fourth vacant chamber 76.

In this embodiment, the airbag 1C has substantially a right-left symmetrical configuration (direction of two neighboring vacant chambers) with the tether panel 72 between the second vacant chamber 74 and the third vacant chamber 75. All the panels have the same configuration except that face and back are reversed between the first panel 80 and the fourth panel 110, and between the second panel 90 and the third panel 100.

The first panel 80 and the fourth panel 110 have first peripheral edges 81 and 111 and second peripheral edges 82 and 112 parallel to each other, and intermediate sections 83 and 113 extending between the first peripheral edges 81 and 111 and the second peripheral edges 82 and 112 in parallel therewith. The intermediate sections 83 and 113 are positioned closer to the first peripheral edges 81 and 111 than the second peripheral edges 82 and 112. The interfaces between the first peripheral edges 81 and 111 and the intermediate sections 83 and 113 serve as tether surfaces 84 and 114 forming a first tether panel 70 and a third tether panel 72, respectively, of the airbag 1C product. The interfaces between the intermediate sections 83 and 113 and the second peripheral edges 82 and 112 form outer shell surfaces 85 and 115 forming the outer shells of the vacant chambers 73 and 76. The above-mentioned vent ports 77 are provided in the tether surfaces 84 and 114.

The second panel 90 and the third panel 100 have, respectively, first peripheral edges 91 and 101 and second peripheral edges 92 and 102 parallel to each other, and first halfway sections 93 and 103 and second halfway sections 94 and 104 extending between the first peripheral edges 91 and 102 and the second peripheral edges 92 and 102 in parallel therewith. The first halfway sections 93 and 103 are positioned closer to the first peripheral edges 91 and 101, and the second halfway sections 94 and 104 are positioned closer to the second peripheral edges 92 and 102. The interfaces between the first peripheral edges 91 and 101 and the first halfway sections 93 and 103 serve as first outer shell surfaces 95 and 105 forming the upper surfaces of the vacant chambers 74 and 75. The interfaces between the second peripheral edges 92 and 102 and the second halfway sections 94 and 104 serve as second outer shell surfaces 96 and 106 forming the lower surfaces of the vacant chambers 74 and 75, respectively. The interfaces between the first halfway sections 93 and 103 and the second halfway sections 94 and 104 serve as tether surfaces 97 and 107 forming the second tether panel 71 in the airbag 1C product. Vent ports 77 are provided in the tether surfaces 97 and 107.

When manufacturing the airbag 1C from the thus configured panels 80, 90, 100 and 110, first as shown in FIG. 10, the intermediate section 83 of the first panel 80 and the first peripheral edge 91 of the second panel 90 are placed one on top of the other and connected by sewing. The intermediate section 113 of the fourth panel 110 and the first peripheral edge 101 of the third panel 100 are placed one on top of the other, and connected together by sewing. Reference numerals 120 and 121 represent seams sewing the intermediate section 83 and the peripheral edge 91, and the intermediate section 113 and the peripheral edge 101.

Then, the outer shell surface 85 of the panel 80 and the first outer shell surface 95 of the second panel 90 are folded so as to part from each other. The outer shell surface 115 of the fourth panel 110 and the first outer shell surface 105 of the third panel 100 are folded so as to part from each other.

Then, as shown in FIG. 11, the outer surfaces of the tether surfaces 97 and 107 of the second panel 90 and the third panel 100 (surfaces facing opposite to the outer shell surfaces 85 and 115 of the first panel 80 and the fourth panel 110) are placed one on top of the other, and the first halfway sections and the second halfway sections 94 and 104 of the second panel 90 and the third panel 100 are connected together by sewing. Reference numerals 122 and 123 represent seams connecting these halfway sections 93 and 103, and the halfway sections 94 and 104, respectively.

Connection of the first halfway sections 93 and 103 and second halfway sections 94 and 104 integrates tether surfaces 97 and 107 of the second panel 90 and the third panel 100, thus forming the second tether panel 71.

Thereafter, the second outer shell surfaces 96 and 106 of the second panel 90 and the third panel 100 are folded so as to part from each other, and as shown in FIG. 12, the second peripheral edge 92 of the second panel 90 is placed over the first peripheral edge 81 of the first panel 80, and the second peripheral edge 102 of the third panel 100 is placed over the first peripheral edge 111 of the fourth panel 110. From the opposite side, the second peripheral edge 82 of the first panel 80 is placed over the first peripheral edge 81 of the first panel 80, and the second peripheral edge of the fourth panel 110 is placed over the first peripheral edge 111 of the fourth panel 110. These peripheral edge 81, 82 and 92 and peripheral edge 111, 112 and 102 are integrally connected. Reference numerals 124 and 125 represent seams connecting these peripheral edges 81, 82 and 92, and peripheral edges 111, 112 and 102.

As a result, there is formed a cylindrical airbag 1C intermediate product of which the interior is divided into four vacant chambers 73, 74, 75 and 76 by the tether panels 71, 72 and 73. By blocking both ends of this cylindrical airbag 1C intermediate product, a bag-shaped airbag 1C product is completed. Reference numeral 126 in FIG. 9 represents a seam blocking both ends of the airbag 1C.

In this airbag 1C too, the tether panels 70, 71 and 73 are formed integrally with the panels 80, 90, 100 and 110 forming the outer shell of the airbag 1C, thereby permitting easy manufacture.

Figure 13:
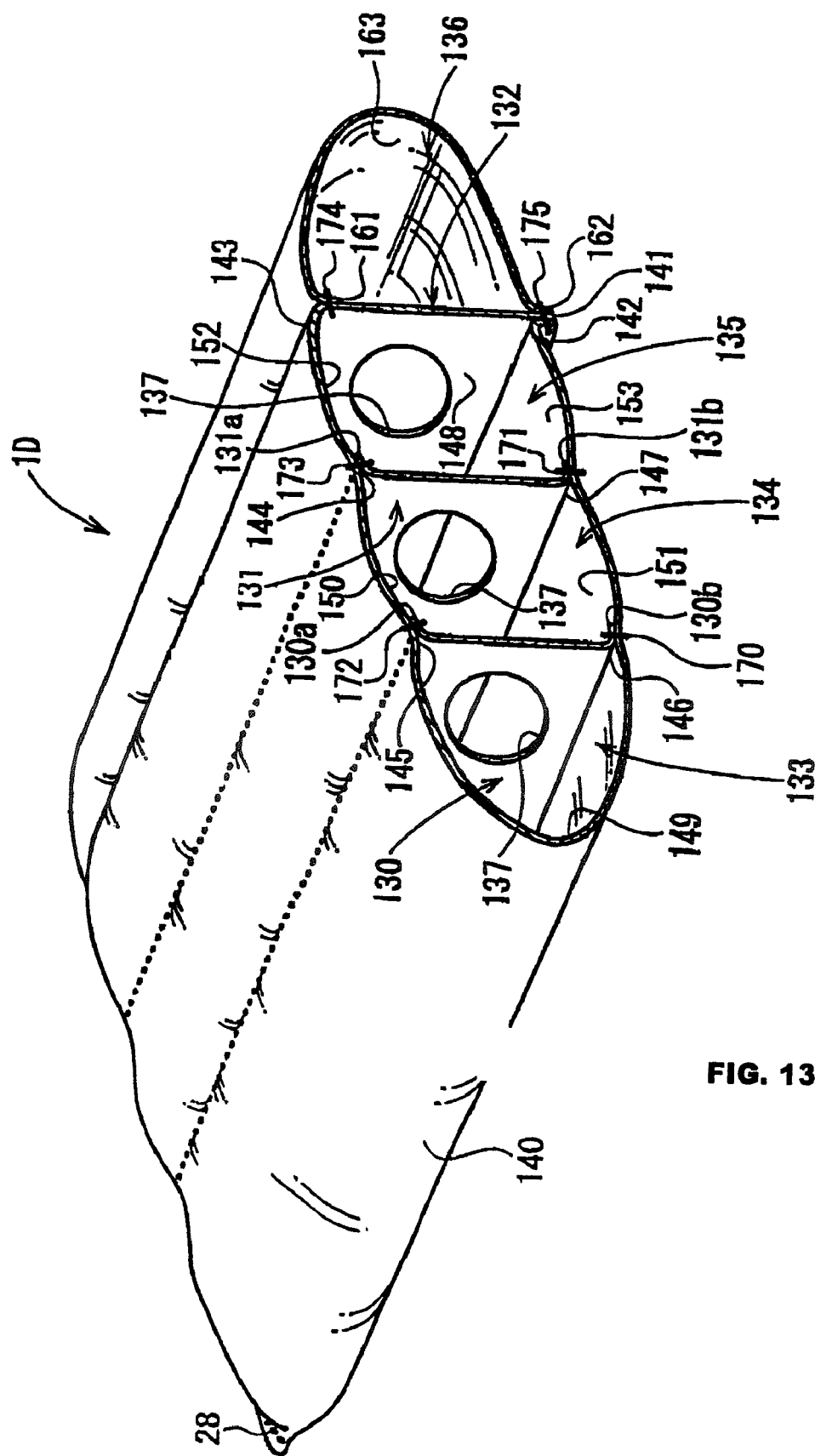
FIG. 13 is a sectional perspective view of the airbag of an embodiment.
Figure 14:
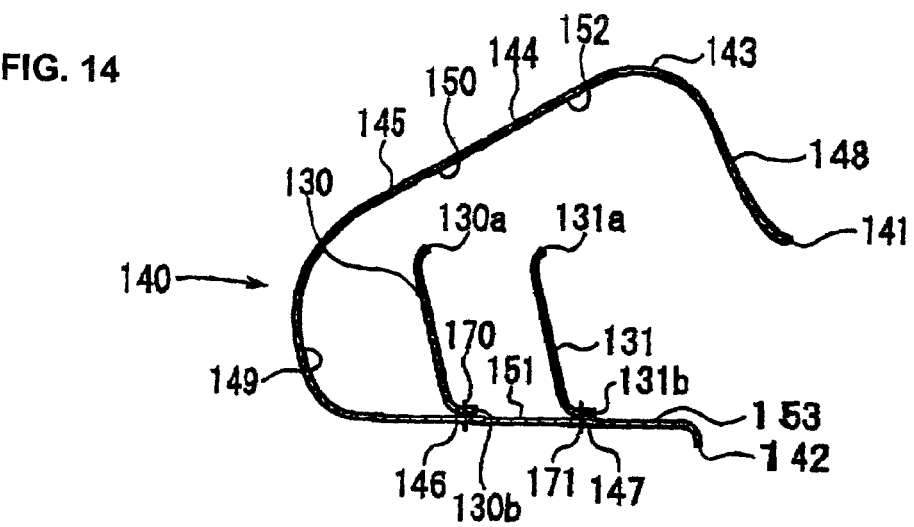
FIG. 14 is a descriptive view of the manufacturing procedure of the airbag shown in FIG. 13.
Figure 15:
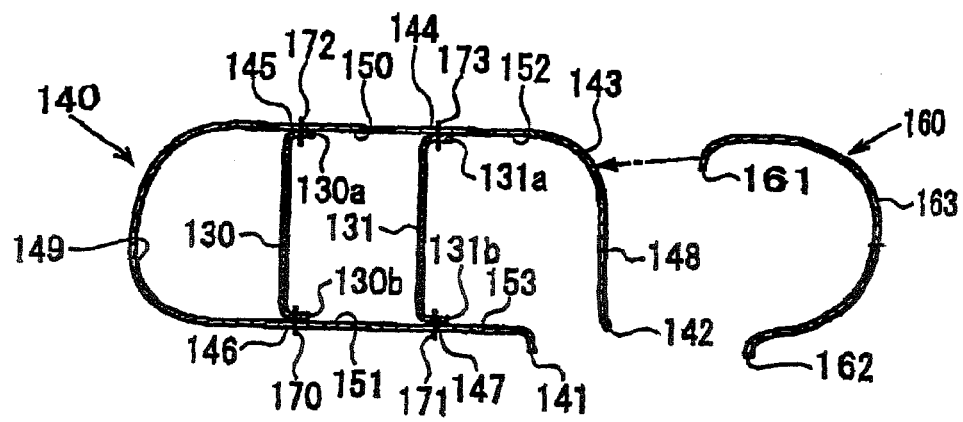
FIG. 15 is a descriptive view of the manufacturing procedure of the airbag shown in FIG. 13.
Figure 16:
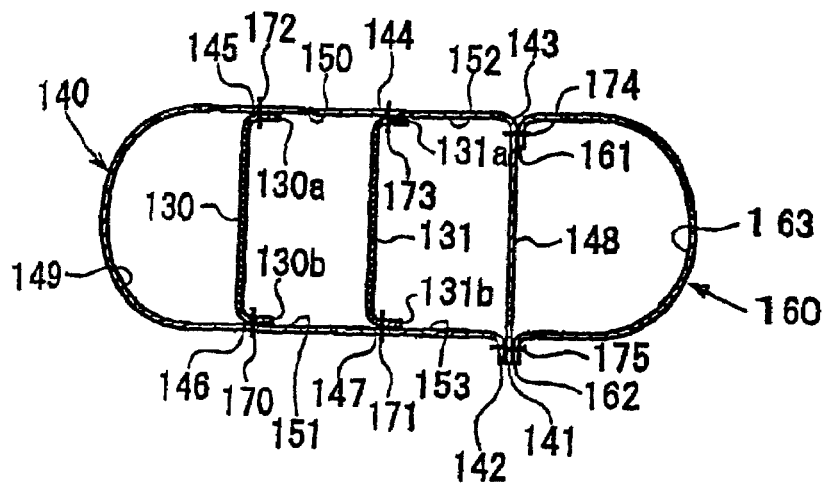
FIG. 16 is a descriptive view of the manufacturing procedure of the airbag shown in FIG. 13.

FIG. 13 is a sectional perspective view of the airbag 10D of further another embodiment. FIGS. 14 to 16 are descriptive views of the manufacturing procedure of the airbag 10D.

The interior of the airbag 1D is divided into a first vacant chamber 133, a second vacant chamber 134, a third vacant chamber 135 and a fourth vacant chamber 136 by a first tether panel 130, a second tether panel 131 and a third tether panel 132. In this embodiment, the third tether panel 132 is provided integrally with panels forming the outer shell of the airbag 1D (a first panel 140 and a second panel 160 described later), and the first tether panel 130 and the second tether panel 131 are provided separately from the panel forming the outer shell of the airbag 1D. These tether panels 130, 131, and 132 extend in parallel with each other in the extending direction of the airbag 1D. Vent ports 137 are provided in the tether panels 130, 131 and 132 for ensuring communication between the vacant chambers 133 and 134, between the vacant chambers 134 and 135, and between the vacant chambers 135 and 136.

The configuration and the manufacturing procedure of this airbag 1D will now be described.

The entire outer shell of the airbag 1D is composed of a first panel 140 forming outer shells of the first to third vacant chambers 133 to 135, and a second panel 160 forming an outer shell of the fourth vacant chamber.

The first panel 140 has a first peripheral edge 141 and a second peripheral edge 142 parallel to each other, and a first halfway section 143, a second halfway section 144, a third halfway section 145, a fourth halfway section 146 and a fifth halfway 147 extending between the first and second peripheral edges 141 and 145 in parallel therewith. The first halfway section 143 is positioned closer to the first peripheral edge 141. The second to fifth halfway sections 144 to 147 are positioned sequentially closer to the second peripheral edge 142 than the first halfway section 143.

The interface between the first peripheral edge 141 and the first halfway section 143 serves as a tether surface 148 forming the third tether panel 132 in the airbag 1D product. The interface between the third halfway section 145 and the fourth halfway section 146 serves as a first outer shell 149 forming the outer shell of the first vacant chamber 133. The interfaces between the third halfway section 145 and the second halfway section 144, and between the fourth halfway section 146 and the fifth halfway section 147 serve as the second outer shell surface 150 and the third outer shell surface 151 forming the outer shells of the upper surface and the lower surfaces of the second vacant chamber 134. The interfaces between the second halfway section 144 and the first halfway section 143, and between the fifth halfway section 147 and the second peripheral edge 142 serve as the fourth outer shell surface 152 and the fifth outer shell surface 53 forming the upper and lower outer shells of the third vacant chamber 135. The vent port 137 is formed in the tether surface 148.

In this embodiment, the interval between the third halfway section 145 and the fourth halfway section 146 (the first outer shell surface 149) is substantially equal to the interval between the first peripheral edge 161 and the second peripheral edge 162 of the second panel 160 (the sixth outer shell surface 163). The interval between the third halfway section 145 and the second halfway section 144 (the second outer shell surface 150) is substantially equal to the interval between the fourth halfway section 146 and the fifth halfway section 147 (the outer shell surface 151). The interval between the second halfway section 144 and the first halfway section 143 (the fourth outer shell surface 152) is substantially equal to the interval between the fifth halfway section 147 and the second peripheral edge 142 (the fifth outer shell surface 153).

The second panel 160 has a first peripheral edge 161 and a second peripheral edge 162 substantially parallel to each other, and the interface between these peripheral edges 161 and 162 serves as an outer shell surface 163 forming the outer shell of the fourth vacant chamber 136. In this embodiment, the interval between first peripheral edge 1161 and the second peripheral edge 162 (the sixth outer shell surface 163) is substantially equal to the interval between the third halfway section 145 of the first panel 140 and the fourth halfway section 146 (the first outer shell surface 149).

The first tether panel 130 and the second tether panel 131 have first peripheral edges (upper side) 130a and second peripheral edges (lower side) 130b and 131b parallel to each other, respectively. In this embodiment, the interval between the first peripheral edges 130a and 131a and the second peripheral edges 130b and 131b is substantially equal to the interval between the first halfway section 143 of the first panel 140 and the first peripheral edge 141 (the tether surface 148).

When manufacturing an airbag 1D from the thus configured panels 140, 160, 130 and 131, first as shown in FIG. 14, the second peripheral edge 130b of the first tether panel 130 and the second peripheral edge 131b of the second tether panel 131 are connected by sewing to the fourth halfway section 146 and the fifth halfway section 147 of the first panel 140. Reference numerals 170 and 171 represent seams sewing the halfway section 146 with the peripheral edge 130b and the halfway section 147 with the peripheral edge 131b.

Then, the first panel 140 is folded so that the second outer shell surface 150 faces the third outer shell surface 151, and the fourth outer shell surface 152 faces the fifth outer shell surface 153. The first peripheral edge 130a of the first tether panel 130 and the first peripheral edge 130a of the second tether panel 131 are sequentially connected by sewing to the third halfway section 145 of the first panel 130 and the second halfway section 144, respectively. Reference numerals 172 and 173 represent seams sewing the peripheral edge 130a to the halfway section 145 and the peripheral edge 131a to the halfway section 144.

Then, as shown in FIG. 15, the first peripheral edge 161 of the second panel 160 is placed on the first halfway section 143 of the first tether panel 140 in alignment, and connected together by sewing. Reference numeral 174 (FIG. 16) represents the seam sewing the halfway section 143 with the peripheral edge 161.

Thereafter, the sixth outer shell surface 163 of the second panel 160 and the fourth outer shell surface 152 of the first panel 140 are folded so as to part from each other, and as shown in FIG. 16, the first peripheral edge 141 and the second peripheral edge 142 of the first panel 140 and the second peripheral edge 162 of the second panel 160 are placed one on top of the other and integrally connected by sewing. Reference numeral 175 represents the seam integrally sewing these peripheral edges 141, 142 and 162.

As a result, there is configured a cylindrical airbag 1D intermediate product of which the interior is divided by the tether panels 130, 131 and 132 into four vacant chambers 133, 134, 135 and 136. By blocking both ends of the cylindrical airbag 1D intermediate product, a bag-shaped airbag 1D product is completed. Reference numeral 176 in FIG. 13 represents the seam blocking both ends of the airbag 1D.

As in this airbag 1D, the degree of freedom of partitions in the airbag (layout of vacant chambers) is improved by arranging tether panels provided separately from the airbag outer shell, apart from the tether panels provided integrally with the airbag outer shell in the airbag.

The above-mentioned embodiments are only examples of the present invention, and the present invention is not limited by the forms of the above-mentioned embodiments. For example, the forms of the above-mentioned embodiments cover cases of application of the present invention to an A-pillar covering airbag and an airbag apparatus having such an airbag. The present invention is applicable to an airbag covering the cowl or the bonnet, or an airbag covering the inner surface of the vehicle and airbags of various uses and airbag apparatuses having such airbag.

What is claimed is:

1. An elongate airbag for being inflated along an exterior surface of an elongate pillar of a vehicle, the elongate airbag comprising:
    an airbag body having a generally elongate, narrow tubular configuration upon inflation thereof for extending longitudinally along the exterior surface of the vehicle pillar;
    a pair of elongate chambers in the airbag body that are inflated upon airbag deployment to extend in a longitudinal direction in the generally elongate, narrow tubular airbag body;
    a pair of material panels of the airbag body that are each formed into an elongate configuration extending in the longitudinal direction with one of the material panels defining one of the elongate chambers without the other material panel and both of the material panels cooperating to completely form the other elongate chamber;
    one panel portion of the one material panel extends in the longitudinal direction and acts to tether the airbag for limiting inflation thereof in a direction transverse to the longitudinal direction and away from the exterior surface of the vehicle pillar;
    at least one vent port in the one panel portion; and
    a duct connected to only one or the other of the elongate chambers for directing inflation gas therein.

2. The airbag of claim 1 wherein the at least one vent port provides for inflation gas flow between the chambers for substantially uniform airbag inflation.

3. The airbag of claim 1 wherein the one material panel is longer than the other material panel of the pair of material panels in a widthwise direction transverse to the longitudinal direction due to the one panel portion thereof so that only a single material layer divides the two chambers from each other.

4. The airbag of claim 1 including a gas generator for inflating the airbag chambers for airbag deployment.

5. An elongate airbag comprising:
    an airbag body having a generally elongate, narrow tubular configuration upon inflation thereof;
    an elongate internal space in the airbag body that is inflated upon airbag deployment to extend in a longitudinal direction in the generally elongate, narrow tubular airbag body;
    at least one elongate material panel of the airbag body extending at least partially about the internal space;
    at least one elongate tether panel that extends in the longitudinal direction and divides the internal space into at least two elongate chambers that both extend in the longitudinal direction;
    a plurality of vent holes in the tether panel spaced longitudinally from each other in the longitudinal direction along the elongate tether panel to allow the two chambers to be in communication for substantially uniform airbag inflation;
    a plurality of projections of the material panel spaced longitudinally from each other in the longitudinal direction along the elongate material panel with each of the projections having an aperture for receiving a fastener to permit the airbag body to be arranged in an elongate, flat and folded configuration thereof prior to airbag deployment to extend along and be fixed to a vehicle pillar with the fasteners; and
    a cylindrical duct in communication with only one of the elongate chambers for directing inflation gas therein and formed by the tether panel so as to extend orthogonally to the longitudinal direction and spaced longitudinally from the material panel projections.

6. The airbag of claim 5 wherein the one material panel and one tether panel are of a single material piece.

7. The airbag of claim 5 wherein the at least one material panel comprises a pair of material panels that are folded to form the two chambers.

8. The airbag of claim 7 wherein the one tether panel is integral with one of the pair of material panels so that the one tether panel comprises a single material layer.

9. The airbag of claim 7 wherein the at least one tether panel comprises two tether panels each integral with one of the pair of material panels so that there is a double material layer through which the vent hole is formed.

* * * * *